April 25, 1950  J. O. EDWARDS  2,505,608
TEACHING DEVICE

Filed July 22, 1946  3 Sheets-Sheet 1

INVENTOR:
JOSEPH O. EDWARDS.
BY
Huebner, Maltby & Beeler
ATTORNEYS.

April 25, 1950 J. O. EDWARDS 2,505,608
TEACHING DEVICE
Filed July 22, 1946 3 Sheets-Sheet 2
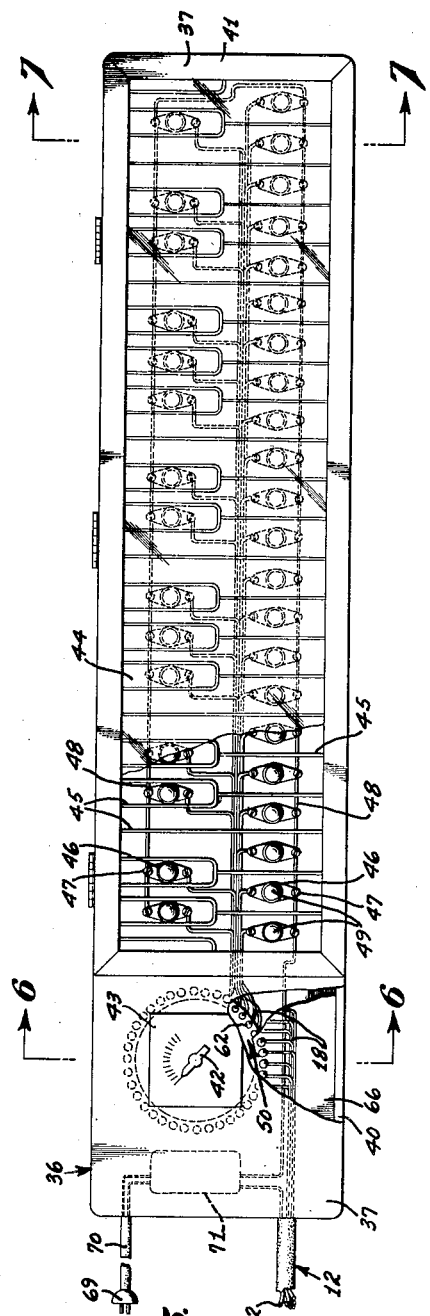
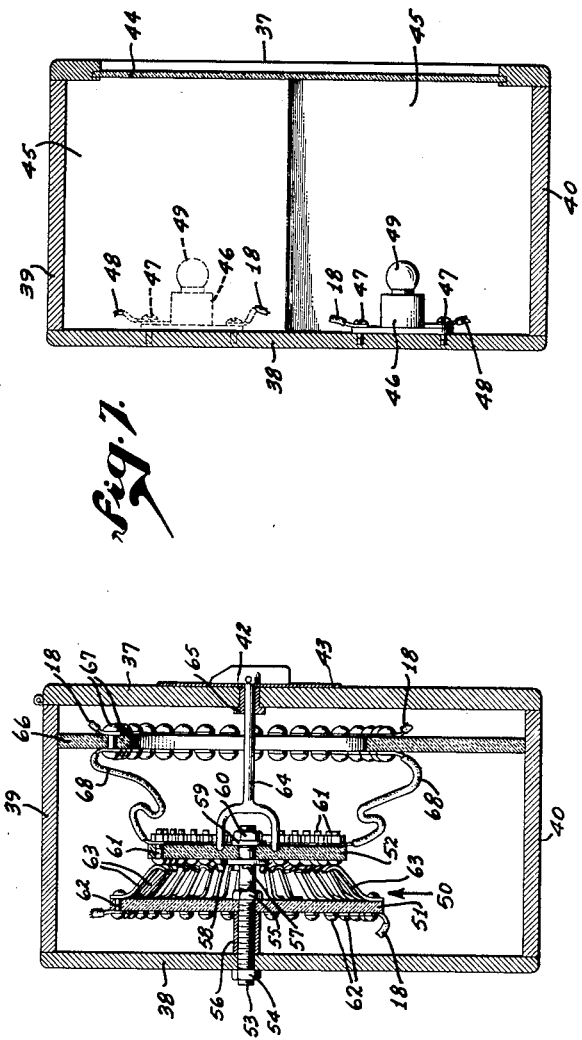
INVENTOR:
JOSEPH O. EDWARDS.
BY
*Huebner Malloy & Lochler*
ATTORNEYS.

April 25, 1950     J. O. EDWARDS     2,505,608
TEACHING DEVICE

Filed July 22, 1946     3 Sheets-Sheet 3

INVENTOR:
JOSEPH O. EDWARDS.
BY
ATTORNEYS.

Patented Apr. 25, 1950

2,505,608

UNITED STATES PATENT OFFICE 2,505,608

TEACHING DEVICE

Joseph O. Edwards, Fresno, Calif.

Application July 22, 1946, Serial No. 685,449

6 Claims. (Cl. 84—470)

This invention relates to teaching devices and more particularly to aids to teaching, demonstrating and directing music.

Broadly the problems of teaching are concerned with the control and manipulation of the students' environment so as to stimulate his interest and learning. Stimuli are provided in the environment to appeal to any one of the so-called five senses or combinations thereof, it being recognized that for most educational purposes visual stimuli are most effective, auditory next in value, and stimuli such as appeal to the senses of smell, taste and touch being obviously less advantageously employed in general educational procedures.

Conventionally, the teaching of music has almost exclusively employed auditory stimuli; such as tonal exercises, musical demonstrations and oral instructions. The little visual appeal that has been employed has dealt principally with purely static printed or written material and with keyboard demonstrations that can be witnessed by only a very few students at one time.

An object of my invention, therefore is to provide a teaching device adapted to present dynamic, as well as static, visual illustrations for educational purposes.

Another object is to provide such a device optionally coordinated with auditory stimuli for teaching, demonstrating and directing purposes.

Another object is to represent, and simulate by visual means, the manipulation of musical keyboards in a manner permitting the demonstration of keyboard problems before large audiences.

Another object is to provide a visual teaching aid simply and easily coordinated with, and motivated by, musical keyboards.

Another object is to provide automatic, visual transposition of musical notes.

In the directing of musical organizations, an object is to provide a single directing means adapted to give simultaneously a plurality of musical pitch and rhythm directions and thus to obviate the present necessity for the musicians to divide their attention between a conductor and a musical score.

Another object is to stimulate student interest in music and to increase teaching efficiency.

A further object is to cause music students to see the piano keyboard as a reduction of any vocal or instrumental score.

Still further objects are to provide a means for presenting problems in harmony, melody and rhythm in response to manipulation of a piano keyboard and to provide improved elements and arrangements thereof in a device of the character and for the purposes set forth.

In accomplishing these and other objects of the present invention, I have provided improved details of structure, the preferred form of which is illustrated in the accompanying drawings, wherein:

Fig. 5 is a side elevation of the simulated keyboard a translucent panel thereof representing said keyboard being removed to reveal inner elements.

Fig. 6 is an enlarged fragmentary section taken on line 6—6 of Fig. 5.

Fig. 7 is an enlarged fragmentary section taken on line 7—7 of Fig. 5.

For convenience in description, we will refer to a switch assembly 10, an illuminable simulated piano keyboard 11, and an electrical cable 12 providing communication between the two.

Figure 1:
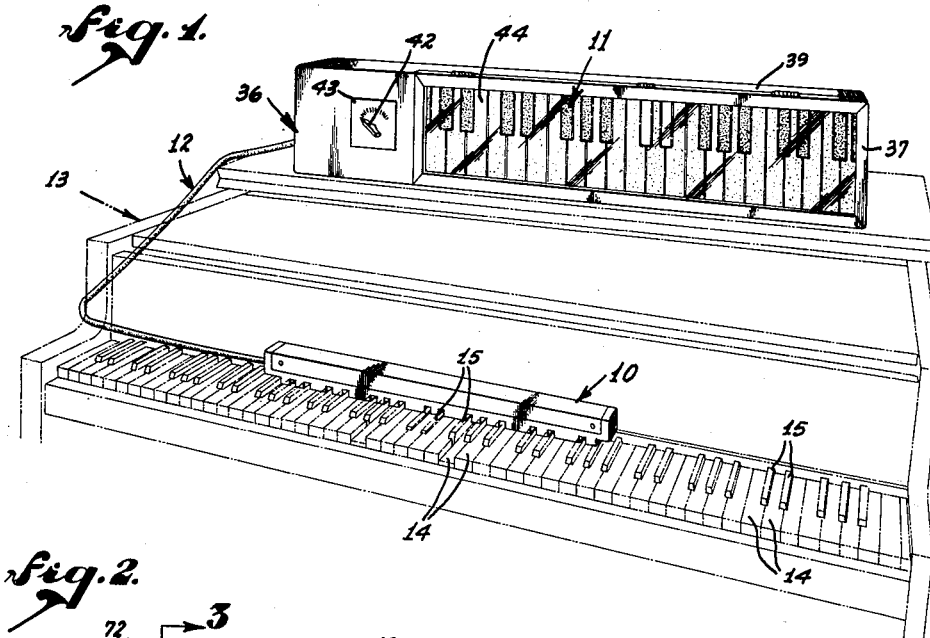
Fig. 1 is a perspective view of the device of the present invention as employed with a conventional piano.

In Fig. 1, a portion of a conventional piano is illustrated generally at 13 having a keyboard on which white keys 14 and black keys 15 are clearly indicated. The switch assembly 10 is shown in operating position resting on the piano keyboard.

Figure 3:
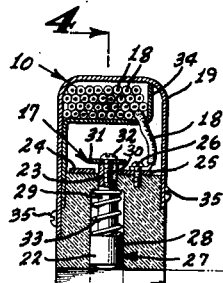
Fig. 3 is an enlarged section of the same taken on line 3—3 of Fig. 2.
Figure 4:
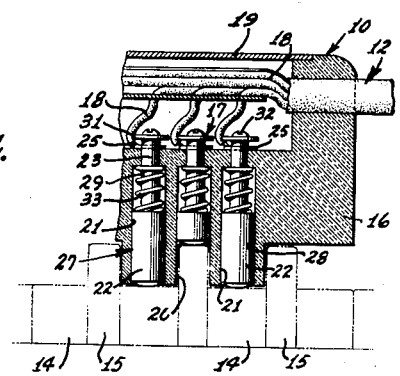
Fig. 4 is a further enlarged fragmentary section taken on line 4—4 of Fig. 3.

The switch assembly comprises a foundation member 16, a plurality of switches 17, lead wires 18 and guard 19, indicated in Figs. 3 and 4. The bottom portion of the housing member is transversely grooved as illustrated at 20 in Fig. 4 to provide a resting surface for the switch assembly in contact with each key occupying a relaxed position within the range of said assembly.

Bores 21 having lower portions of greater diameter designated by the numeral 22 and upper portions 23 of lesser diameter are formed through the foundation member in substantially erect positions and preferably so spaced as to cause one such bore to be centered on each piano key within the range of the switch assembly.

Longitudinally of the switch assembly and at one side of the bores 21 a ground plate 24 of electrical conducting material is secured to the foundation member. On the foundation member at the side opposite each bore from the ground plate, a contact plate 25 is secured by means of a screw bolt 26 engaged within a screw threaded opening in the foundation member. The screw bolt also comprises a post for securing lead wires 18, presently more fully described, in electrical communication with the contact plates.

The primary function of the switch assembly 10 is to provide means for closing electrical circuits of the present device in response to manipulation of keys of the piano. To this end, switch fingers 27; having lower portions 28 adapted to slide within and be guided by the bores 21, and upper portions 29 of reduced diameter; are positioned within said bores. The upper portions of the fingers are of a size and shape adapted to extend through the upper portions 23 of the bores 21 and be slidably guided thereby. Screw threaded openings 30 are formed in the upper end portions of the fingers. Bridge elements 31 of electrical conducting material are secured transversely to the upper end portions of the fingers by means of bolts 32 screw threadably engaged within the openings 30. The bridge elements thus provide electrical communication between their respective contact plates 25 and the ground plate 24 when their respective switch fingers are permitted to descend. It is to be noted that the switch fingers are of a length sufficient to break the described electrical communications when their downwardly extended end portions are held flush with the lower surfaces of the foundation member 16. In Fig. 4, it is further to be noted that because of the grooves 20, provided to receive the black keys 15 of the keyboard, the switch fingers borne thereabove must be shortened to compensate for such variation.

To give the bridge elements 31 a positive closing action when the piano keys therebelow are depressed and the switch fingers are thus permitted to descend, helical compression springs 33 are provided circumjacent the smaller portions 29 of the switch fingers 27 within the lower portions 22 of the bores 21. Upper ends of the compression springs bear against the shoulder in the bores formed by the joining of the lower portions 22 with the upper portions 23 and the lower ends of said springs bear against the shoulder formed on the switch fingers by the intersection of the smaller portions 29 with the larger portions 28.

A longitudinal shelf element 34 is shown in Figs. 3 and 4 mounted on the foundation member 16 and supporting the lead wires 18 in a position safely removed from interference with the individual switches 17 of the switch assembly. The guard 19 is fitted over the upwardly exposed portions of the switch assembly and frictionally engages the sides and ends of the foundation member 16. Set screws 35 are employed to secure the guard in place.

The illuminable simulated piano keyboard 11, illustrated in detail in Figs. 5, 6 and 7, comprises a housing 36, preferably in the form of a rectangular box whose portions are arbitrarily designated for purposes of description as a front 37, a back 38, a top 39, a bottom 40, and end 41. In Fig. 1, the front 37 is seen to mount a transposition pointer 42, a dial 43 therefor, and to have an elongated window 44 of translucent material marked to represent the keys of a piano keyboard.

Directly behind the window 44, and in abutting relation to said window and to the back 38, are provided opaque partitions 45. The partitions are shaped to coincide with the dividing marks of the piano keyboard represented on the window 44 and thus to form compartments behind the keys. Because of said partitions being impervious to light, they permit individual illumination of the key replicas on the window without illuminating contiguous key replicas.

Receptacles 46 are mounted on the inner surface of the back 38, in the compartments formed by the partitions, by screws 47. Said screws also serve to secure lead wires 18 and supply wires 48, presently more fully described, to terminals of the receptacles. Illuminating means such as conventional light bulbs 49 are engaged within said receptacles.

It is readily seen, that the wiring of each of the switches 17 in series with each of the illuminating means 49, results in the energizing of the illuminating means in response to the depressing of the piano keys under the switches.

It is frequently desirable to transpose musical notes whose piano keys are depressed. To this end a transposition switch 50, illustrated in Fig. 6, is illustrated. The switch comprises a rear mounting panel 51, a front mounting panel 52, and means for mounting said panels on the back 38 of the housing 36. Said mounting means comprises a screw threaded rod 53 engaged in an opening in the back of the housing, nuts 54 and 55 and a hollow cylindrical spacer 56 employed to secure the rod in the housing and the rear mounting panel, borne thereby, fixedly in spaced relation to the back 38 thereof. The rod 53 has radial ears 57 formed thereon. A pair of washers 58 and 59 and a nut 60 are employed to rotatably mount the front panel 52 on the rod 53; the nut 60 and ears 57 serving to position the front panel in spaced relation to the rear mounting panel 51.

A plurality of mounting bolts 61, of conducting material are concentrically arranged near the periphery of the front panel and extend therethrough. Their rearward ends form contact elements and their forward ends provide convenient screw threaded electrical connecting posts. Similarly, a like number of mounting bolts 62 are preferably concentrically arranged near the periphery of the rear panel and are extended therethrough. These latter mounting bolts provide convenient mounting posts at their rear end portions and clamping means at their front end portions. Spring contact means 63 are secured to the rear panel 51 by said clamping means in electrical communication with the bolts 62. The spring contact means are shaped to engage individually the contact elements of the bolts 61 and are sufficiently resilient to permit the rotation of the front panel and contact elements and to provide individual electrical communication with said contact elements wherever said front panel is permitted to rest. To manipulate the front panel a bifurcated control means 64 is rotatably mounted in the front 37 of the housing 36 aligned with the rod 53, said control means mounting the pointer 42 on its outer end and engaging receptacles in the front panel at its inner end. A bushing 65 is preferably provided in the front of the housing to position said control means.

In conjunction with the transposition switch 50, a landing panel 66, of insulating material and having a center opening formed therein, is mounted in the housing 36 in concentric relation to the axis of rotation of the front panel 52. A plurality of electric terminals 67 extend through the landing panel and provide for the individual securing of electrical conductors at each side of said panel and in electrical communication therethrough.

Slack conductor wires 68 are secured to the rearwardly disposed ends of the terminals 67 and the forward ends of the mounting bolts 61. For purposes of clarity, only two such wires are indicated in Fig. 6. It is to be understood, however, that each of the mounting bolts 61 is preferably linked to a terminal 67.

Figure 2:
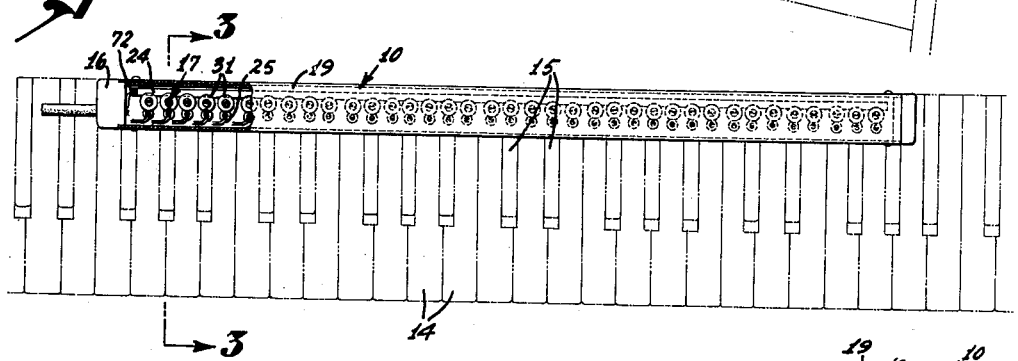
Fig. 2 is a plan view of a portion of a piano keyboard illustrating a switch assembly in operational position thereon having a portion of the cover of said switch assembly removed to reveal inner elements thereof.
Figure 8:
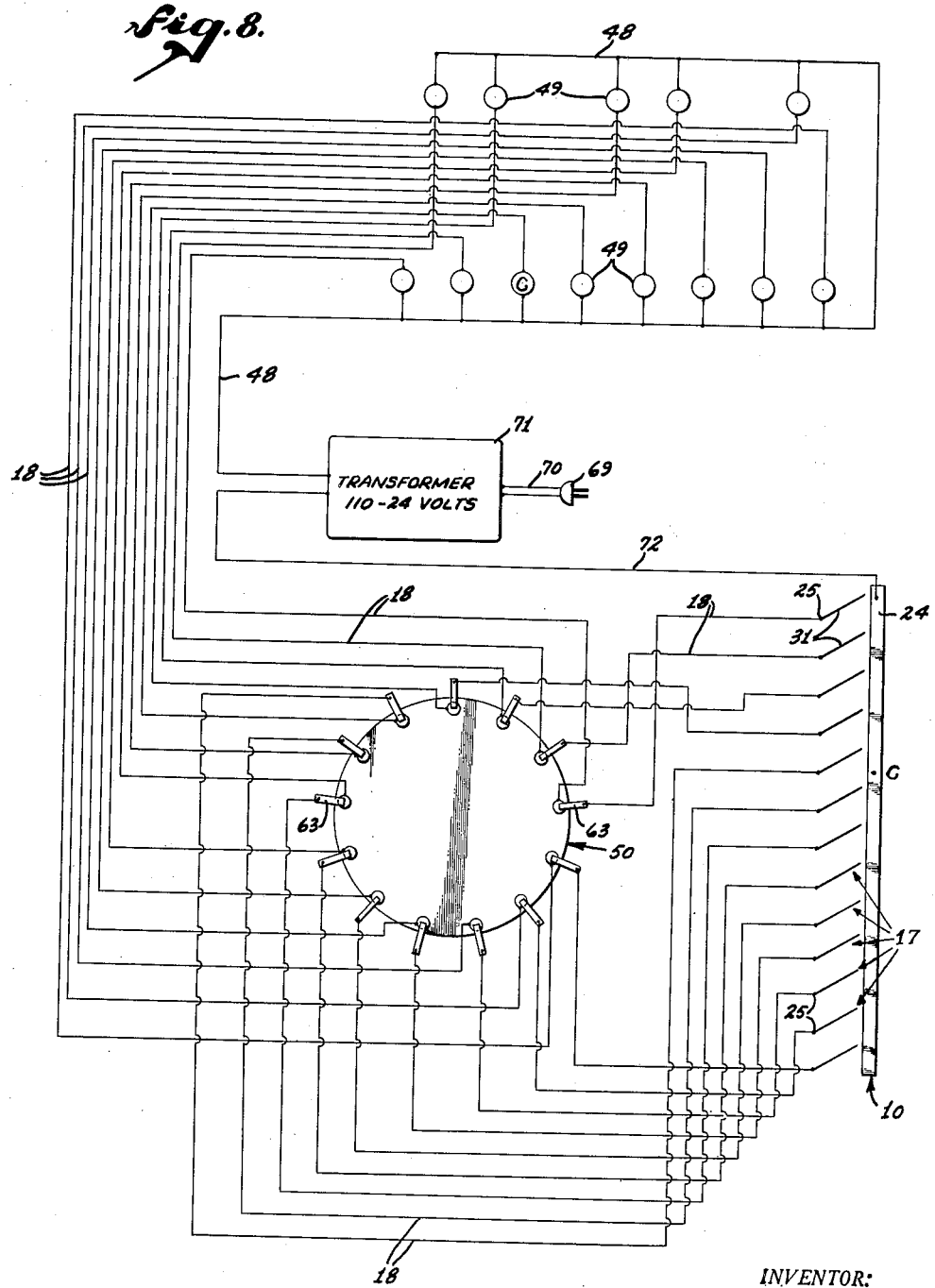
Fig. 8 is a schematic diagram of the electrical system of the present invention. The system is reduced to a single octave of the keyboard for purposes of clarity.

So far, the electric circuits involved in the apparatus of the present invention have been only briefly alluded to and fragmentarily described. The schematic wiring diagram shown in Fig. 8, for purposes of clarity, illustrates the electrical circuits involved for a switch assembly of only thirteen switches. Actually the apparatus may be constructed to embrace any desired number of keys of a keyboard. A convenient size has been found to be that illustrated in Figs. 1 and 2 extending three octaves. In Fig. 8, the transposition switch 50 has been simplified in response to the reduced number of circuits involved.

A conventional socket plug 69 is provided to engage a source of electrical energy, such as a 110 volt power supply commonly available in schools, homes, studios and stages. An extension cord 70 leads to a step-down transformer 71 which reduces the voltage at its output terminals an amount in keeping with the limitations of the switches and illuminating means employed in the circuits. A conductor 72 communicates between one output terminal of the transformer 71 and the ground plate 24 and the supply wire 48 communicates between the other output terminal of the transformer and one pole of each of the illuminating means 49. The several circuits controlling the illumination of the simulated piano keyboard in response to manipulation of the piano keyboard are arranged in electrical parallel between the ground plate 24 and the supply wire 48.

Since the parallel circuits are similar, the tracing of one such circuit from "C" to "C," for example, will suffice to explain each circuit. The lead wire 18 is connected to the contact plate 25 of the switch 17 manipulated by the piano key "C" and to the terminal of the illuminating means 49 for the key replica "C" opposite to the terminal energized by lead wire 48. The transposition switch is interposed in the lead wire 18 as previously described. As indicated in Fig. 8 the electrical path leads directly from the "C" switch to the simulated key "C." The depressing of the piano key "C" illuminates the simulated key "C." By turning the transposition switch any desired number of half tones in either direction the note of the depressed piano key "C" may be transposed as desired. The manipulation of the transposition switch contemporaneously adjusts all circuits for identical transposition displacing.

*Operation*

The operation of the apparatus of the present invention is apparent from the preceding description and will be summarized briefly at this point.

The switch assembly 10 is positioned on a piano keyboard as shown in Fig. 1. The simulated piano keyboard is arranged to be visible to the observers it is desired to direct or instruct. The socket plug 69 is engaged with a source of electrical energy. The transposition switch is set at a neutral position.

So arranged, the depressing of the keys of the piano keyboard such as "A" and "G" in Fig. 1 permits their switch fingers to descend, close their respective circuits, and illuminate key replicas "A" and "G" in the simulated keyboard 11. When pressure is released from the piano keys, they return to their relaxed positions, raise their respective switch fingers, and interrupt their circuits.

Thus, dynamic or static illustrations may be presented as desired in response to piano keyboard manipulation; said piano keyboard and manipulation thereof being accurately simulated in a manner visible to large groups. Diatonic and chromatic scales are easily demonstrated. Problems of harmony, melody and rhythm may be illustrated. Visual stimuli coordinated with auditory stimuli from the piano are presented for instructional and directive purposes. Keys and their intervals may be visually presented in a manner conducive to a thorough comprehension of chords and other harmonic, melodic, and rhythmic considerations.

By setting the transposition switch for any desired number of half tones of displacement either way from the neutral position, the key replicas of the simulated piano keyboard 11 are illuminated in response to the manipulation of the piano keyboard and are automatically transposed from their true simulated positions a responsive amount. Thus the playing of the piano results in an automatic visual transposition of the music so produced. As an illustration of one of the many useful applications this specific feature has, the transposition switch may be set the number of half tones removed from its neutral position as the key of an instrument to be played with a piano varies from that of the piano. So adjusted, the playing of a note on the piano results in the illumination of a key replica, the playing of which on said instrument results in tonal agreement with the piano.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim is new and desire to secure by Letters Patent is:

1. The combination of a simulated piano keyboard, means for independently illuminating key replicas thereof, electrical switch means for energizing said illuminating means in response to the manipulation of a piano keyboard, and a transposition switch for selectively causing key replicas in any predetermined musical key to be illuminated in response to the movement of any piano key engaged by the switch means.

2. The combination of a simulated piano keyboard comprising a plurality of piano key replicas and illuminating means therefor, a switch assembly adapted to be positioned on a piano keyboard and having a plurality of switches operated by movements of the keys of said piano, electrical conductors communicating between said switches and their respective illuminating means in the simulated keyboard and completing electrical circuits with a source of electrical energy, and a transposition switch interposed between the switches and the illuminating means whereby depressed piano keys are caused to illuminate corresponding key replicas or key replicas transposed into any other predetermined musical key in response to transposition switch adjustment.

3. The combination of a simulated piano keyboard comprising a plurality of piano key replicas and illuminating means therefor, a switch assembly adapted to be positioned on a piano keyboard and having a plurality of switches and switch fingers to operate said switches in response to movements of the keys of the piano keyboard, electrical conductors communicating between the switches and their respective illuminating means in the simulated keyboard, between said illuminating means and a source of electrical energy and between said switches and the opposite pole of the source of electrical energy, and a transposition switch interposed between the switches and illuminating means whereby the depressing of a piano key may be caused to illuminate a responsive key replica in any predetermined musical key.

4. In a teaching device adapted to present to a pupil synchronously employed auditory and visual stimuli, the combination of a switch assembly adapted to rest upon a piano keyboard and providing switch fingers individual to the keys of the piano keyboard operably connected to individual switches within the assembly whereby said switches are closed in response to the depressing of the keys of their respective fingers sufficiently to sound the piano; a simulated piano keyboard comprising a housing member having a translucent side marked to delineate key replicas, opaque cells positioned behind said key replicas shielding each key replica from light from adjoining cells, and illuminating means positioned in the cells so as to direct their light through their respective key replicas; conductors electrically connecting the individual switches of the switch assembly with the illuminating means of corresponding individual cells in the simulated piano keyboard across a source of electrical energy; and a transposition switch interposed in said conductors for simultaneously altering the switch-illuminating means circuits so as to cause each switch to control an illuminating means a predetermined number of cells in either direction from corresponding connection.

5. The combination of a simulated keyboard having independently illuminable key replicas, means for selectively illuminating the key replicas in response to manipulation of a conventional keyboard, and a transposition device interposed between the illuminating means and the key replicas for selectively altering the relationship of the illuminating means to the key replicas.

6. For use with a piano having operably exposed keys transversely arranged in an elongated keyboard, which piano is productive of sound upon depressing of the keys, the combination of an elongated switch assembly of a width less than the lengths of the piano keys rested on the keys longitudinally of the keyboard, said switch assembly having switch members therein individually closed by the depressing of a piano key thereunder, a simulated piano keyboard having independently illuminable key replicas, an electrical system interconnecting the individual switches in the switch assembly with individual key replicas in the simulated keyboard for illumination of said key replicas in response to depression of keys of the piano, and a transposition switch electrically interposed in the electrical system for selectively altering the illuminating relationship of the switch assembly and the key replicas.

JOSEPH O. EDWARDS.

REFERENCES CITED

The following references are of record in the file of this patent:

UNITED STATES PATENTS

| Number | Name | Date |
|---|---|---|
| 667,541 | Loving | Feb. 5, 1901 |
| 836,327 | Pool | Nov. 27, 1906 |
| 1,070,256 | Herrmann | Aug. 12, 1913 |
| 1,232,176 | Baker | July 3, 1917 |
| 1,613,400 | McAleavey | Jan. 4, 1927 |
| 1,889,418 | Pierce | Nov. 29, 1932 |